United States Patent [19]

Nichols et al.

[11] 4,097,432

[45] Jun. 27, 1978

[54] FLAME AND SMOKE-SUPPRESSED VINYL CHLORIDE RESIN COMPOSITIONS

[75] Inventors: James D. Nichols, York; Edwin J. Quinn, Lancaster, both of Pa.

[73] Assignee: Armstrong Cork Company, Lancaster, Pa.

[21] Appl. No.: 781,677

[22] Filed: Mar. 28, 1977

[51] Int. Cl.² .............................................. C08K 5/10
[52] U.S. Cl. .......................... 260/23 XA; 260/31.2 R; 260/45.75 P; 260/45.75 W; 260/45.85 R
[58] Field of Search ...... 260/23 XA, 31.2 R, 45.75 P, 260/45.75 W, 45.85 R

[56] References Cited

U.S. PATENT DOCUMENTS

| | | | |
|---|---|---|---|
| 3,945,974 | 3/1976 | Schwarcz et al. | 260/45.75 W |
| 3,993,607 | 11/1976 | Florence | 260/45.75 P |
| 4,022,945 | 5/1977 | MacKenzie et al. | 260/45.75 P |

*Primary Examiner*—V. P. Hoke

[57] ABSTRACT

Flame and smoke-suppressant polymer compositions are described comprising a resinous polymer of vinyl chloride and a flame and smoke-suppressant amount of
(1) at least one compound of the formula

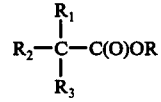

wherein R is $C_1$ to $C_{18}$ linear or branched alkyl and $R_1$, $R_2$ and $R_3$ are the same or different and are hydrogen, $C_1$ to $C_8$ linear or branched alkyl or halogen; and
(2) an oxide, hydroxide or salt of iron (III), zinc, or mixtures thereof.

18 Claims, No Drawings

FLAME AND SMOKE-SUPPRESSED VINYL CHLORIDE RESIN COMPOSITIONS

BACKGROUND OF THE INVENTION

1. Field of the Invention

This invention relates to smoke-suppressed polymeric compositions. More particularly it relates to flame-retardant and low-smoke vinyl resin compositions.

2. Description of the Prior Art

There is a growing concern about the fire safety of a variety of consumer products. As such, a growing recognition that injuries and fatalities arising from fire and flame accidents are not primarily due to burns, but rather to smoke, gases, and oxygen deficiency. Those polymeric compositions containing relatively high percentages of halogen, either chemically attached to the polymer substrate or physically added as plasticizers, are generally considered flame retardant. In this respect, an important flame-retardant, halogen-containing polymer is poly(vinyl chloride). PVC, in its rigid form, is often used in buildings, aircraft, and the like. Rigid vinyl chloride, while being an acceptable flame retardant, has much higher levels of smoke production than considered desirable. In its plasticized form, as in fabrics, upholstery, and surface coverings, additional flammability and smoke generating problems are created whose alleviation has to date been subject to enormous research and development effort. In this respect, a myriad of inorganic materials have been found to function as flame retardants in poly(vinyl chloride)-based compositions. Antimony oxide-containing vinyl compositions have always been regarded as generally flame retardant, although not necessarily smoke retardant. Other metal oxides have served to diminish the disadvantages of antimony oxide in this respect; however, oxides such as calcium oxide and zinc oxide have been noted as detrimental when used in urethane systems so as to partially replace antimony oxide. In U.S. Pat. No. 3,957,723, Lawson et al, it has been disclosed that poly(vinyl chloride) systems containing zinc oxide with aluminum oxide trihydrate are of reduced flammability and diminished smoke intensity. Other PVC-based compositions have been noted to be fire and smoke retardant by the addition of zinc tungstate (see U.S. Pat. No. 3,901,850). Generally, it has been recognized that the incorporation of various mineral flame retardants in a polymer composition results in the diminished flammability of the polymers. But, concurrently, the emission of increased quantities of smoke occurs as a result of the increased tendency of the polymer to smolder. It has, therefore, been desirable to have additives, in addition to the flame retardant mineral ones, that are active in suppressing smoldering polymers. As a result, a variety of mineral/organic flame retardant/smoke retardant compositions have been found to achieve this result. For example, Elcik, in U.S. Pat. No. 3,983,290, has disclosed that zinc borate is useful in PVC compositions containing a phosphate ester plasticizer. Metal/organic complexes, such as ferrocenes, have also found to be similarly effective in this regard. It has been subsequently established that smoke retardant additives for vinyl chloride polymers should adhere to a number of conditions to make them practically usable. The smoke-retardant additive should be effective within the range of combustion temperatures of the poly(vinyl chloride) polymer composition so as to inhibit smoldering. Further, smoke-retardant additives should be sufficiently compatible with all constituents of the polymeric composition, that is, resinous polymers, stabilizers, plasticizers, and the like, both primary and secondary, antioxidants, flame retardants and others, to remain incorporated under conditions of formulation and use. Additionally, the additives should be sufficiently compatible so they can be mixed and fused into coherent, homogeneous material with good stability and will not separate easily from the final compounded formulation when a stress is imposed upon the system, such as occurs during processing. Chemical stability is a further significant aspect of compatibility of the additive in the formulation, and such should not enhance degradation during processing nor by normal aging.

SUMMARY OF THE INVENTION

It is an object of this invention to provide a new flame and smoke-retardant composition which can be used alone or together with other additives in polyhalocarbon resins to reduce emission of smoke and promote enhanced flame retardancy upon the burning of such compositions.

It is a further object of this invention to provide a flame and smoke-retardant additive for poly(vinyl chloride) compositions which is compatible with the other constituents of the polymeric composition under conditions of formulation and use.

It is another object of the present invention to provide flame and smoke-retardant properties without undue impairment of critical polymer properties is poly(vinyl chloride) resinous compositions.

These and other objects of the present invention have been attained by the incorporation of an alkyl acetate plasticizer into a vinyl chloride polymer composition.

DESCRIPTION OF THE PREFERRED EMBODIMENTS

The flame and smoke-retardant compositions of the present invention are obtained by incorporating into a halocarbon polymeric composition comprising a vinyl chloride resin and stabilizer
(1) at least one flame and smoke-suppressing plasticizer of the formula

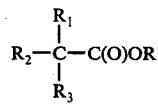

where R is $C_1$ to $C_{18}$ linear or branched alkyl and $R_1$, $R_2$ and $R_3$ are the same or different and are hydrogen, $C_1$ to $C_8$ linear or branched alkyl or halogen; and (2) an oxide, hydroxide or salt of iron (III), zinc, or mixtures thereof.

As a result of incorporating these acetate plasticizers into the halocarbon polymeric materials, a polymer composition is formed that is both flame retardant and substantially reduced in smoke generation in both flaming and nonflaming modes.

The acetate plasticizers of the present invention are of the general formula

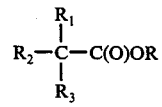

where R is $C_1$ to $C_{18}$ linear or branched alkyl, and $R_1$, $R_2$, and $R_3$ are the same or different and are hydrogen, $C_1$ to $C_8$ linear or branched alkyl or halogen.

Many of the acetates are commercially available in sufficiently pure form to be admixed with the halocarbon polymer composition as received. However, a general method of preparing the less readily available acetates involves reacting acetic acid or the substituted acetic acids with the $C_1$ to $C_{18}$ linear or branched aliphatic alcohol in the presence of a suitable catalyst at about 180°–200° C. and collecting water distillate until the theoretic amount is obtained. Catalysts of choice are those organotin compounds such as dibutyltin dilaurate.

Examples of $R_1$, $R_2$ and $R_3$ include hydrogen, methyl, ethyl, propyl, isopropyl, butyl, pentyl, neopentyl, 2-ethylhexyl, chloro, bromo and fluoro. Typical examples of R include methyl, ethyl, propyl, isopropyl, n-butyl, 2-ethylhexyl, nonyl, dodecyl and stearyl.

These acetate plasticizers are useful in the low-smoke compositions of the present invention in from about 1 to about 80 parts per 100 parts of polyhalocarbon resin (phr), preferably 10 to 55 phr, most preferably 15 to 40 phr.

Generally, it has been found that the incorporation of 0.01 to 20 parts by weight per 100 parts of an additive, that is an oxide, hydroxide or salt of zinc or iron (III), further reduces the amount of smoke in the organic plasticized compositions of this invention. Preferably, the zinc or iron compound is blended into the formula in from about 0.5 to about 6 parts by weight per 100 parts of polyhalocarbon. Most preferably about 1 to about 3 phr by weight of zinc oxide or iron (III) oxide per 100 parts of polyhalocarbon resin is incorporated in these formulations. Mixtures of the above iron (III) or zinc compounds are also flame and smoke-suppressant additives herein.

Halocarbon polymers (e.g., the resinous polymers of vinyl chloride) used in this invention include homopolymers, copolymers and blends of homopolymers and/or copolymers, such as illustrated by various poly(vinyl chloride) resins. These copolymers may contain from 0 up to about 50% by weight of at least one other olefinically unsaturated monomer, more preferably at least one other vinylidene monomer (i.e. monomer containing at least one terminal $CH_2$=C< group per molecule) copolymerized therewith, more preferably up to about 20% by weight of such monomer. Suitable monomers include 1-olefins containing from 2 to 12 carbon atoms, more preferably from 2 to 8 carbon atoms, such as ethylene, propylene, 1-butene, isobutylene, 1-hexane, 4-methyl-1-pentene and the like; dienes containing from 4 to 10 carbon atoms including conjugated dienes as butadiene, isoprene, piperylene and the like; ethylidene norbornene and dicyclopentadiene; vinyl esters and allyl esters such as vinyl acetate, vinyl chloroacetate, vinyl propionate, vinyl laurate, allyl acetate and the like; vinyl aromatics such as styrene, α-methyl styrene, chlorostyrene, vinyl toluence, vinyl naphthalene and the like; vinyl and allyl ethers and ketones such as vinyl methyl ether, allyl methyl ether, vinyl isobutyl ether, vinyl n-butyl ether, vinyl chloroethyl ether, methyl vinyl ketone and the like; vinyl nitriles such as acrylonitrile, methacrylonitrile and the like; cyanoalkyl acrylates such as α-cyanomethyl acrylate, the α-,β- and α-cyanopropyl acrylates and the like; olefinically unsaturated carboxylic acids and esters thereof; including α,β-olefinically unsaturated acids and esters thereof such as methyl acrylate, ethyl acrylate, chloropropyl acrylate, butyl acrylate, hexyl acrylate, 2-ethylhexyl acrylate, dodecyl acrylate, octadecyl acrylate, cyclohexyl acrylate, phenyl acrylate, glycidyl acrylate, methoxyethyl acrylate, ethoxyethyl acrylate, hexylthioethyl acrylate, methylmethacrylate, ethyl methacrylate, butyl methacrylate, glycidyl methacrylate and the like, and including esters of maleic and fumaric acid and the like; amides of the α,β-olefinically unsaturated carboxylic acids such as acrylamide and the like; divinyls, diacrylates and other polyfunctional monomers such as divinyl benzene, divinyl ether, diethylene glycol diacrylate, ethylene glycol dimethacrylate, methylene-bis-acrylamide, allyl pentaerythritol, and the like; bis(β-haloalkyl)alkenyl phosphonates such as bis(β-chloroethyl) vinyl phosphonate and the like.

The halocarbon polymers may be prepared by any method known to the art such as by emulsion, suspension, bulk or solution polymerization. The additive compounds may be mixed with the polymer emulsion, suspension, solution or bulk mass before monomer recovery and/or drying. More preferably, the compounds may be mixed with dry granular or powdered polymers. The polymer and compound may be mixed thoroughly in granular or powder form in apparatus such as a Henschel mixer and the like. Alternatively, this step may be eliminated and the mixing done while the polymer mass is fluxed, fused and masticated to homogeneity under fairly intensive shear in or on a mixer apparatus having its metal surface in contact with the material. The fusion temperature and time will vary according to the polymer composition and level of additive compound, but will generally be in the range of about 300° to 400° F. and 2 to 10 minutes.

Most of the commercially available PVC plasticizers can be successfully incorporated into these compositions in addition of the flame and smoke-suppressing acetate plasticizers. The most common types include monomeric or polymeric esters of adipic, azelaic, oleic, phosphoric, sebacic, stearic, phthalic or trimellitic acid and of allyl alcohol, glycerol, butanol, isobutanol, pentanol(s), (methyl) cyclohexanol(s), 2-ethylhexanol, octanol(s), benzyl alcohol, tetrahydrofurfuryl alcohol, propylene glycol, diethylene glycol, dipropylene glycol, triethylene glycol, tripropylene glycol, polyethylene glycol(s) or polypropylene glycols. The choice type, of course, will be dictated by the desired level of properties and performance of the end product.

Suitable stabilizers for use in the present composition include those conventionally used for stabilizing the polymers employed, e.g. barium-cadmium stearate, laurate or oleate (7 to 15% metal content), (e.g. Ferro 75-001, trademark); barium-zinc octoate (e.g. Synpron 744, trademark Synthetic Products Company); organotin salts (e.g. dibutyltin di-2-ethylhexanoate, Mark 275, trademark); liquid epoxy resin (e.g. bis[3,4-epoxy-6-methylcyclohexylmethyl] adipate, Ciba CY 178, trademark); phosphate chelator (e.g. tri[nonylated phenyl] phosphite, Mark C, trademark); ultraviolet absorber (e.g. 2-[2'-hydroxyphenyl-5-ethyl] benzotriazole, Tinuvin 328, trademark); antioxidant (e.g. tetrakis [methylene 3-(3',5'-di-t-butyl-4'hydroxyphenyl) propionate] methane, Irganox 1010, trademark).

The vinyl chloride or vinylidene chloride polymer compositions of this invention may contain the usual compounding ingredients known to the art such as fillers, opacifiers, lubricants, processing aids, impact modifying resins, antioxidants, and the like.

The term flaming and nonflaming modes is derived from using the NBS Smoke Density Chamber Test. This test is described in great detail in the article by D. Gross, J. J. Loftus, and A. F. Robertson, ASTM Special Technical Publication 422, pages 166–204 (1969). In this test, the maximum specific optical density, $D_m$, corrected for soot deposits on smoke density chamber cell windows is obtained. The examples illustrated herein disclose the average smoke value per gram, SV/g or $D_m$(corr)/g of each sample tested for both flaming (f) and nonflaming (s) modes. The use of $D_m$(corr) or SV/g allows for the correction of the smoke density value for sample weight and, therefore, is valid for samples which are quite thin but have about the same weight. A maximum average $D_m$(corr) value of 450, as determined in the NBS Smoke Density Chamber, has been adopted as a regulation value for interior finishes, including floorings and the like, by the U.S. Department of Health, Education and Welfare.

In the examples that follow, smoke generated by the poly(vinyl chloride) resin-containing compositions was measured by the method described above using an instrument designated Model 4-5800, Aminco-NBS Smoke Density Chamber, American Instrument Company.

Test samples were made by blending the smoke suppressant composition with the thermoplastic resins upon weight basis in terms of parts per hundred of resin (PHR) in typical formula well known in the industry.

Additives were blended with the thermoplastic resins by milling at a temperature of about 160° to 170° C. for five to ten minutes. The sheets were removed from the mill, allowed to cool, and test samples were then cut from the sheet. Sheets obtained in this manner were approximately 14 inches wide by about 0.020 inches in thickness. Test samples for smoke determinations were cut from the sheets produced in this manner.

In accordance with the test procedure mentioned above, each sample was exposed to an energy flux of 2.5 w/cm² from a radiant heater under flaming conditions. Flames from a multi-directional propane burner impinged upon the sample and then into the trough at the bottom. The sample is not altered during these measurements.

The sample was exposed until a minimum transmittance value was obtained. After the smoke had been flushed from the cabinet, the residual attenuation of the light beam, caused by deposits on the windows in the test chamber, was recorded and a correction applied to the maximum absorbence value.

Specific optical densities were then normalized with respect to unit surface area of the sample ($D_m$). The specific optical densities are defined by the following expression: $D_m(\text{corr}) = V/A'L \times A \text{ max. (corr)}$ where V equals test chamber volume; L equals optical path length; A' equals surface area of the sample; A max. (corr) equals A max. minus $A_w$, A max. (corr) minus maximum corrected absorbence during the test, A max. minus maximum measured absorbence during the test, $A_w$ minus absorbence caused by deposits on the window. In order to set forth a clear understanding of this invention, the following illustrative examples are provided. Unless otherwise indicated, all formulations are based on the poly(vinyl chloride) resin and are in parts per hundred parts of such resin.

The following illustrates the general procedure used in the preparation of the acetate plasticizers in accordance with the present invention.

The aliphatic acid to be esterified (1.25 mole) is mixed with the $C_1$ to $C_{18}$ linear or branched aliphatic alcohol (1.0 mole) and dibutyltin dilaurate (2g). The resulting solution is then heated at 180°–190° C. for a period of 4–6 hours until the theoretical amount (1 mole, 18g) of water has been collected. After cooling, the product mixture is washed successively with water, sodium carbonate solution (dilute), and water. After drying over anhydrous sodium sulfate, the ester is isolated by distillation at reduced pressure.

The following Masterbatch formulation was admixed in a Henschel mixer:

| | |
|---|---|
| Polyvinyl chloride homopolymer Firestone F9290; specific viscosity 0.32 by ASTM D-1243-60, Method B | |
| Organotin thermal stabilizer Mark 275 | 3 phr |
| Zinc oxide | 1 phr |
| Smoke-suppressant acetate plasticizer | Varied |

Samples were cut from the milled sheets as indicated above.

Table I

Smoke-Suppressant Acetate[1]

$$R_2-\underset{\underset{R_3}{|}}{\overset{\overset{R_1}{|}}{C}}-C(O)OR$$

| Example | R | $R_1$ | $R_2$ | $R_3$ | Flaming DM (corr) | Flaming SV/g | Nonflaming DM (corr) | Nonflaming SV/g | $\frac{F+N}{2}$ | Oxygen Index | Flaming[2] SV Normalized | Nonflaming[2] SV Normalized |
|---|---|---|---|---|---|---|---|---|---|---|---|---|
| 1 | 2—($C_2H_5$)—$C_6H_{12}$ | H | H | H | 284 | 35 | 129 | 14 | 207 | 35.5 | 35 | 14 |
| 2 | " | Cl | H | H | 137 | 34 | Not Determined | | | 32.4 | 28 | — |
| 3 | " | Cl | Cl | H | 331 | 34 | 218 | 22 | 275 | 37.8 | 24 | 16 |
| 4 | " | Cl | Cl | Cl | 344 | 34 | 231 | 35 | 288 | 42.4 | 21 | 22 |
| 5 | " | F | F | F | 416 | 42 | 135 | 12 | 226 | 63.0 | 32 | 9 |
| 6 | " | Br | H | H | 300 | 39 | 240 | 32 | 270 | 40.5 | 27 | 22 |
| 7 | " | Cl | Cl | $CH_3$ | 378 | 36 | 104 | 9 | 241 | 37.9 | 24 | 6 |
| 8 | $C_6H_{13}$ | H | H | H | 324 | 36 | 144 | 16 | 234 | 42.8 | 36 | 16 |
| 9 | " | Cl | H | H | 252 | 34 | 126 | 18 | 189 | 38.5 | 27 | 14 |
| 10 | " | Cl | Cl | H | 274 | 36 | 105 | 13 | 190 | 43.0 | 24 | 9 |
| 11 | " | Cl | Cl | Cl | 341 | 38 | 184 | 21 | 263 | 47.7 | 22 | 12 |
| 12 | " | F | F | F | 439 | 40 | 163 | 16 | 301 | 63.5 | 29 | 12 |
| 13 | " | Br | H | H | 268 | 33 | 131 | 16 | 200 | 48.3 | 21 | 10 |
| 14 | " | Cl | Cl | $CH_3$ | 381 | 40 | 97 | 12 | 239 | 43.9 | 25 | 8 |
| Comparative-1 | Masterbatch | | | | 376 | 37 | 147 | 13 | 262 | 63.9 | — | — |
| Comparative-2 | Masterbatch with 30 phr 2-ethylhexylphthalate | | | | 526 | 59 | 249 | 32 | 388 | 29.8 | — | — |

Table I-continued

Smoke-Suppressant Acetate[1]

$$R_2-\underset{\underset{R_3}{|}}{\overset{\overset{R_1}{|}}{C}}-C(O)OR$$

| Example | R | R₁ | R₂ | R₃ | Flaming DM (corr) | SV/ g | Nonflaming DM (corr) | SV/ g | $\frac{F+N}{2}$ | Oxygen Index | Flaming[2] SV Normalized | Nonflaming[2] SV Normalized |
|---|---|---|---|---|---|---|---|---|---|---|---|---|
| Comparative-3 | Masterbatch with 3 phr M-275 | | | | 591 | 48 | 168 | 16 | 380 | 70.4 | — | — |
| Comparative-4 (no zinc oxide) | 2-(C₂H₅)—C₆H₁₂ | H | H | H | 549 | 68 | 180 | 18 | 365 | 30.3 | 68 | 18 |
| Comparative-5 (no zinc oxide) | 2-(C₂H₅)—C₆H₁₂ | Cl | Cl | H | 572 | 67 | 141 | 16 | 357 | 31.9 | 48 | 11 |

[1]All plasticizers were added at a level of 30 phr
[2]Normalized flame and smoke values are obtained to account for the number of moles of additive present and are calculated as follows:
(Moles of additive/moles of smoke-suppressing acetate) × SV/g = SV normalized.

Table II

Smoke-Suppressant Acetate[1]

$$R_2-\underset{\underset{R_3}{|}}{\overset{\overset{R_1}{|}}{C}}-C(O)OR$$

| Example | R | R₁ | R₂ | R₃ | Concentration phr | Flaming Dm(corr) | SV/g | Nonflaming Dm(corr) | SV/g | $\frac{F+N}{2}$ | Oxygen Index | Flaming SV Normalized | Nonflaming SV Normalized |
|---|---|---|---|---|---|---|---|---|---|---|---|---|---|
| 15 | 2-(C₂H₅)—C₆H₁₂ | H | H | H | 10 | 334 | 35 | 160 | 17 | 247 | 54.3 | 35 | 17 |
| 1 | " | H | H | H | 30 | 284 | 35 | 124 | 14 | 207 | 35.5 | 35 | 14 |
| 16 | " | H | H | H | 55 | 324 | 40 | 115 | 16 | 220 | 36.0 | 40 | 16 |
| 17 | " | Cl | Cl | H | 10 | 334 | 39 | 169 | 18 | 267 | 57.6 | 28 | 13 |
| 3 | " | Cl | Cl | H | 30 | 284 | 34 | 218 | 22 | 275 | 37.8 | 24 | 16 |
| 18 | " | Cl | Cl | H | 55 | 324 | 37 | 215 | 25 | 263 | 33.9 | 26 | 18 |
| 19[2] | " | Cl | Cl | H | 10 | 590 | 59 | 181 | 22 | 386 | 55.4 | 42 | 16 |
| 20[2] | " | Cl | Cl | H | 30 | 410 | 50 | 160 | 20 | 285 | 40.7 | 36 | 14 |
| 21[2] | " | Cl | Cl | H | 55 | 372 | 50 | 215 | 27 | 284 | 35.4 | 36 | 19 |
| 22[3] | " | Cl | Cl | H | 30 | 213 | 67 | 143 | 18 | 178 | 38.0 | 19 | 13 |

[1]See Table I for definition of terms
[2]Examples 19-21 are 3 phr zinc oxide
[3]Zinc oxide replaced by Fe₂O₃

The tables clearly illustrate the surprising decrease in both flame and smoke values when using the acetate plasticizers of the present invention in combination with an oxide, hydroxide of salt of iron (III) or zinc. The comparative examples particularly point out the effectiveness of the acetate/iron(III) or zinc oxide combination.

What is claimed is:

1. A flame and smoke-retarded composition comprising a resinous polymer of vinyl chloride and a flame and smoke-suppressing amount of
   (a) at least one compound of the formula

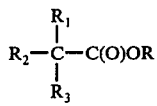

wherein R is C₁ to C₁₈ linear or branched alkyl and R₁, R₂, and R₃ are the same or different and are hydrogen, C₁ to C₈ linear or branched alkyl or halogen; and
   (b) an oxide, hydroxide or salt of iron (III), zinc or mixtures thereof.

2. The flame and smoke-retarded composition of claim 1 wherein said compound is present in from about 1 to about 80 parts by weight per hundred parts of said halocarbon polymer.

3. The flame and smoke-retarded composition of claim 2 wherein R is C₁ to C₈ linear or branched alkyl and R₁, R₂, and R₃ are the same and are hydrogen or halogen.

4. The flame and smoke-retarded composition of claim 2 wherein R is linear or branched alkyl and R₁, R₂, and R₃ are different and are selected from the group hydrogen, C₁ to C₈ linear or branched alkyl or halogen.

5. The flame and smoke-retarded composition of claim 2 wherein R is C₁ to C₈ linear or branched alkyl and R₁, R₂, and R₃ are the same and are halogen.

6. The flame and smoke-retarded composition of claim 2 wherein said oxide, hydroxide or salt is 0.01 to 20 parts by weight iron (III) oxide or zinc oxide per 100 parts of halocarbon polymer.

7. The flame and smoke-retarded composition of claim 1 wherein said resinous polymer contains copolymerized therewith up to about 50% by weight of at least one other olefinically unsaturated monomer.

8. The flame and smoke-retarded composition of claim 7 wherein said resinous polymer contains copolymerized therewith up to about 60% by weight of said other olefinically unsaturated monomer.

9. The flame and smoke-retarded composition of claim 8 wherein said other monomer is selected from the group of 1-olefins containing from 2 to 12 carbon atoms, vinyl esters, α,β-olefinically unsaturated carboxylic acids and esters thereof, amides of α,β-olefinically unsaturated carboxylic acids and esters of fumeric and maleic acid.

10. A flame and smoke-retardant composition comprising a vinyl chloride or vinylidene chloride polymer together with
(a) from about 1 to about 80 parts by weight per 100 parts of said polymer of at least one compound of the formula

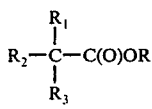

wherein R is $C_1$ to $C_{18}$ linear or branched alkyl and $R_1$, $R_2$, and $R_3$ are the same or different and are hydrogen, $C_1$ to $C_8$ linear or branched alkyl or halogen; and
(b) from about 0.01 to about 20 parts by weight of an oxide, hydroxide or salt of iron (III) or zinc.

11. The flame and smoke-retarded composition of claim 10 wherein said compound is present in from about 1 to about 80 parts by weight per hundred parts of said halocarbon polymer.

12. The flame and smoke-retarded composition of claim 11 wherein R is $C_1$ to $C_8$ linear or branched alkyl and $R_1$, $R_2$, and $R_3$ are the same and are hydrogen or halogen.

13. The flame and smoke-retarded composition of claim 11 wherein R is linear or branched alkyl and $R_1$, $R_2$, and $R_3$ are different and are selected from the group hydrogen, $C_1$ to $C_8$ linear or branched alkyl or halogen.

14. The flame and smoke-retarded composition of claim 11 wherein R is $C_1$ to $C_8$ linear or branched alkyl and $R_1$, $R_2$, and $R_3$ are the same and are halogen.

15. The flame and smoke-retarded composition of claim 11 wherein said oxide, hydroxide or salt is 0.01 to 20 parts by weight iron (III) oxide or zinc oxide per 100 parts of halocarbon polymer.

16. The flame and smoke-retarded composition of claim 10 wherein said resinous polymer contains copolymerized therewith up to about 50% by weight of at least one other olefinically unsaturated monomer.

17. The flame and smoke-retarded composition of claim 16 wherein said resinous polymer contains copolymerized therewith up to about 60% by weight of said other olefinically unsaturated monomer.

18. The flame and smoke-retarded composition of claim 17 wherein said other monomer is selected from the group of 1-olefins containing from 2 to 12 carbon atoms, vinyl esters, $\alpha,\beta$-olefinically unsaturated carboxylic acids and esters thereof, amides of $\alpha,\beta$-olefinically unsaturated carboxylic acids and esters of fumeric and maleic acid.

* * * * *